United States Patent
Wilkinson et al.

(10) Patent No.: US 9,239,288 B1
(45) Date of Patent: Jan. 19, 2016

(54) AIRCRAFT LIGHT DEVICE

(71) Applicants: Dean Andrew Wilkinson, Boise, ID (US); Nathan Howard Calvin, Boise, ID (US)

(72) Inventors: Dean Andrew Wilkinson, Boise, ID (US); Nathan Howard Calvin, Boise, ID (US)

( * ) Notice: Subject to any disclaimer, the term of this patent is extended or adjusted under 35 U.S.C. 154(b) by 0 days.

(21) Appl. No.: 14/581,802

(22) Filed: Dec. 23, 2014

(51) Int. Cl.
  *G01N 21/47* (2006.01)
  *B64D 47/06* (2006.01)
  *F21K 99/00* (2010.01)

(52) U.S. Cl.
  CPC ............ *G01N 21/4738* (2013.01); *B64D 47/06* (2013.01); *F21K 9/50* (2013.01); *G01N 2201/062* (2013.01); *G01N 2201/0636* (2013.01); *G01N 2201/0638* (2013.01)

(58) Field of Classification Search
  CPC ... B64D 47/06; B64D 2203/00; F21S 48/115; G02B 6/0018; G02B 6/0031
  USPC .......... 356/445–448, 121–123; 362/470, 231, 362/247, 248
  See application file for complete search history.

(56) References Cited

U.S. PATENT DOCUMENTS

| | | | |
|---|---|---|---|
| 4,668,120 A | 5/1987 | Roberts | |
| 5,136,483 A | 8/1992 | Schoniger | |
| 5,365,372 A | 11/1994 | Chen | |
| 5,453,729 A | 9/1995 | Chu | |
| 5,703,719 A | 12/1997 | Chen | |
| 6,945,672 B2 | 9/2005 | Du et al. | |
| 7,513,642 B2 | 4/2009 | Sormani | |
| 7,762,700 B2 | 7/2010 | Luo et al. | |
| 8,192,060 B2 * | 6/2012 | Wilkinson | B64D 47/06 340/815.45 |
| 8,292,480 B2 | 10/2012 | Koizumi et al. | |
| 8,573,820 B2 | 11/2013 | Desai et al. | |
| 8,807,803 B2 | 8/2014 | Fabbri et al. | |
| 2005/0007257 A1 * | 1/2005 | Rast | B64D 47/04 340/815.45 |
| 2005/0094401 A1 | 5/2005 | Magarill | |
| 2006/0007013 A1 | 1/2006 | Singer et al. | |
| 2009/0290356 A1 | 11/2009 | Chen | |
| 2010/0238658 A1 | 9/2010 | Xiang et al. | |
| 2013/0249375 A1 * | 9/2013 | Panagotacos | H05B 33/0803 313/13 |

OTHER PUBLICATIONS

Whelen Engineering Whelen Aviation Spare Parts Catalog 2013 p. 20 Searched Dec. 20, 2014. Whelen Engineering Company, Inc. 51 Winthrop Road, Chester, CT 06412.

* cited by examiner

*Primary Examiner* — Hoa Pham
(74) *Attorney, Agent, or Firm* — Gerard Carlson (57) ABSTRACT

An aircraft light device has a base, a printed circuit board, a reflector and a cover-lens. The reflector is comprised of a number of reflective surfaces connected together to form a spline. Light transducers on the printed circuit board are of two main types, light emitters and light receivers. Light emitters provide light for illumination, while light receivers enable detection of received light. The two transducer types can be used alone or in combination.

19 Claims, 8 Drawing Sheets

AIRCRAFT LIGHT DEVICE

CROSS-REFERENCE TO RELATED APPLICATIONS

This application is co-pending with the Design Application entitled: Aircraft Light Device by Wilkinson and Calvin, U.S. application Ser. No. 29/512,959, Filed on Dec. 23, 2014.

FEDERALLY SPONSORED RESEARCH OR DEVELOPMENT

Not applicable.

JOINT RESEARCH AGREEMENT

Not applicable

INCORPORATION-BY-REFERENCE and/or SEQUENCE LISTING

Not applicable

STATEMENT REGARDING PRIOR DISCLOSURES

Not applicable.

FIELD OF THE INVENTION

The present invention relates to the field of light emitting and light detecting devices, and in particular to such devices for aircraft.

BACKGROUND OF THE INVENTION

Currently for aircraft there are requirements for external aircraft illumination to indicate the presence of the aircraft to others. There is also the need for an aircraft to detect if it is painted or illuminated by a potential hazard.

BRIEF SUMMARY OF THE INVENTION

In one embodiment, a light device comprises light emitters or light receivers or a combination of light emitters and light receivers. Collectively light emitters and light receivers are referred to as light transducers. Light transducers are active to light meaning that some types of light transducers emit light while other types receive and are responsive to the reception of light. The type of light emitted or received can be infrared, visible or ultraviolet. The light transducers mount onto a printed circuit board which is attached to a base. In some embodiments, the printed circuit board defines a plane. A reflector sits atop the printed circuit board or is configured to reflect light between the circuit board and an external environment. The reflector is comprised of a number of ring-shaped reflective surfaces which share a common axis at their center. The reflective surfaces form together making a spline. The common axis is perpendicular to the plane of the printed circuit board. A cover-lens connects to the base and encloses the reflector and the printed circuit board. The cover-lens has multiple lens segments. The light transducers, reflector and cover-lens are configured so that light emitted from or received by the light transducers reflects off of the reflector and passes through the cover-lens. The cover-lens further bends the light in desired directions.

External light entering in through the cover-lens reflects off of the reflector and impinges upon the light transducers on the circuit board. The light transducers which are receptive to light detect the presence of the incoming light.

In some embodiments the reflective surfaces are parabolic in shape. The light transducers however lie outside the focus of the parabolic reflective surfaces. In other embodiments, the reflective surfaces have shapes other than parabolic.

In yet other embodiments the lens segments of the lens-cover are substantially parallel to the common axis.

A common type of light transducer which emits light is the light emitting diode, known by the letters LED. LEDs can emit light in a variety of colors, wavelengths or frequencies from infrared, to visible light, to ultraviolet. Other types of light transducers include, but are not limited to, the luminous gas discharge tubes, and the incandescent bulb.

In still other embodiments, wherein the light transducers are light emitting devices such as LEDs, the reflective surfaces and lens segments can be configured or arranged to direct the emitted light in a collimated or non-collimated beam, as required, through the cover-lens. For example, in one embodiment, the reflective surfaces are arranged to reflect a major part of the emitted light from light emitting diodes substantially parallel to the plane of the printed circuit board. Such an embodiment, when mounted on the top or belly of an aircraft, will cast a circle of light substantially in the plane of the aircraft. Such a light pattern is visible to other aircraft at similar altitudes.

In still other embodiments, the lens segments of the cover-lens are configured to blend the exiting light reflected from the reflective surfaces such that the intensity of the light passing through the cover-lens at a given angle relative to the plane of the printed circuit board and at a given distance from the common axis is of substantially equal intensity. This configuration reduces or eliminates "hot spots" of light. A hot spot is where, for a given elevation and distance relative to the printed circuit board, the intensity of the light emitted from the light device varies substantially with azimuth about the common axis.

In some embodiments, some or all of the light transducers are light receivers such as photo resistors, photo diodes or photo transistors. Depending upon type and filtering, light receivers can be sensitive to different wavelengths of light. External light entering the light device, passes through the cover-lens and is reflected off of one or more reflective surfaces onto the light receivers located on the printed circuit board. The light receivers are arranged on the printed circuit board such that one or more light receivers are responsive to light reflected from specific reflective surfaces, whereby the elevation angle of light relative to the plane of the printed circuit board can be determined. With such a configuration, the elevation angle of the external light relative to the printed circuit board can be determined. Additionally, the light receivers are arranged on printed circuit board such that one or more light receivers are responsive to light entering from specific azimuths or azimuth ranges about the common axis. With such a configuration, the azimuth angle or azimuth angle range of the external light relative to the common axis can be determined. Used together, the azimuth and elevation of entering light can determine the direction of a threat. Such a threat might for example be a targeting beam of a hostile weapon or another aircraft at a similar altitude.

Yet another embodiment can combine both types of light transducers, the light emitters and light receivers onto the same printed circuit board. With this combination, the emitters and receivers can be multiplexed and use the same printed circuit board, reflector, and cover-lens. For example in an aircraft application, the emitters can flash to indicate the presence of the aircraft to people external to the aircraft. In between flashes, the light receivers can sense incoming light external from the aircraft that might indicate a threat. Even with a limited number of receivers, interpolation of the information received from the light receivers can give more detailed angular information about the azimuth and elevation of an external light source.

BRIEF DESCRIPTION OF THE SEVERAL VIEWS OF THE DRAWINGS

The summary above, and the following detailed description will be better understood in view of the enclosed drawings which depict details of preferred embodiments. Like reference numbers designate like elements. It should however be noted that the invention is not limited to the precise arrangement shown in the drawings. The features, functions and advantages can be achieved independently in various embodiments of the claimed invention or may be combined in yet other embodiments.

DETAILED DESCRIPTION OF THE INVENTION

In the following description, reference is made to the accompanying drawings that form a part thereof, and in which is shown by way of illustration specific exemplary embodiments in which the invention may be practiced. These embodiments are described in sufficient detail to enable those skilled in the art to practice the invention, and it is to be understood that modification to the various disclosed embodiments may be made and other embodiments may be utilized, without departing from the spirit and scope of the present invention. The following detailed description is therefore, not to be taken in a limiting sense.

Figure 1:
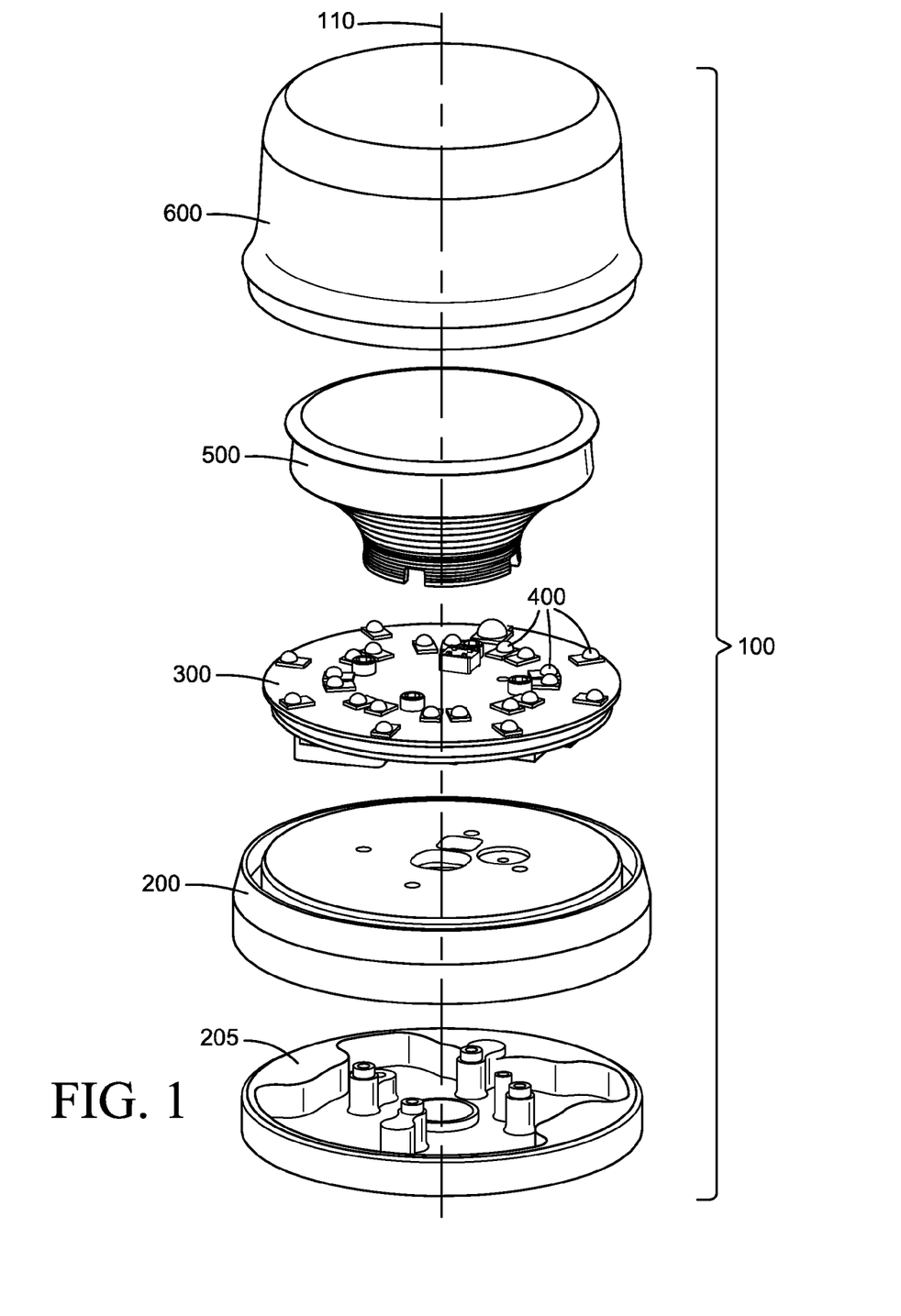
FIG. 1 shows of an exploded perspective view of an embodiment of the light device.

FIG. 1 shows of an exploded view of an embodiment of the light device 100. An aircraft light device 100 has a base 200 and a printed circuit board 300 attached to the base 200. A number of light transducers 400, of which three are indicated, mount on the printed circuit board 300. A reflector 500 above or adjacent the printed circuit board, reflects light between the light transducers 400 and a cover-lens 600. An adapter 205 connects the base 200 to the environment such as a aircraft (not shown).

The light transducers 400 are active to light meaning that some types of light transducers emit light while other types receive and are responsive to the reception of light. Depending upon the particular embodiment, some light devices 100 may have only light emitters, while others may have only light receivers, while still others may have both. Light emitters emit light of one or more wavelengths such as infrared, visible or ultraviolet. The emitted light reflects off of the reflector 500 and through the cover-lens 600 out to the external environment.

The cover-lens 600 acts as a cover of the reflector 500 and printed circuit board 300 by sealing to the base 200. This seal keeps out dirt and moisture thus protecting the light transducers 400 and associated circuitry from the external environment. The cover-lens 600 also incorporates lens segments that act to blend the exiting light thus casting a more uniform light intensity. The cover-lens is discussed in more detail in conjunction with following figures.

The adapter 205, base 200, printed circuit board 300, reflector 500 and cover-lens 600 are centered about a common axis 110. The embodiment of FIG. 1 is thus circular in shape. The common axis 110 is substantially perpendicular to the plane of the printed circuit board 300. The exiting light can be a ring of light of uniform intensity about the common axis. Conversely, depending upon the placement of light emitting light transducers 400 on the printed circuit board 300, and the design of the cover-lens 600, the emitted light intensity can be varied to prefer one azimuth or elevation over another.

Figure 2:
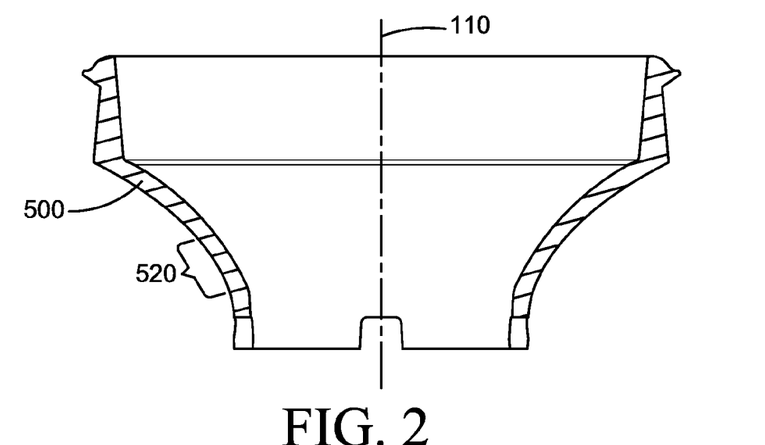
FIG. 2 shows a sectional view of an embodiment of the reflector.
Figure 3:
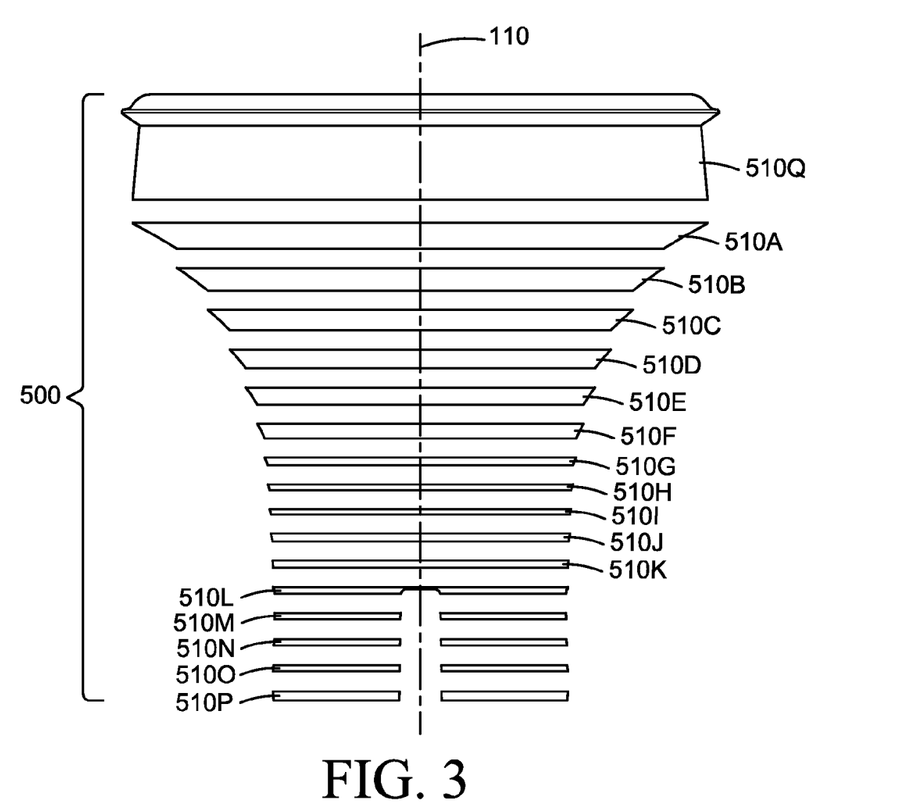
FIG. 3 shows an exploded view of an embodiment of the reflector.

FIG. 2 shows a sectional view of one embodiment of the reflector 500. When viewed from the top or bottom, looking along the common axis 110, the reflector 500 is circular in shape. The surface has a reflective coating 520, for reflecting light. As seen more clearly in FIG. 3, the reflector 500 is made of a number of ring shaped reflective surfaces 510A-510Q. Each of the reflective surfaces 510A-510Q is centered about the common axis 110. The quantity and surface shape of the ring-shaped reflective surfaces 510A-510Q is determined by the desired light pattern discussed in conjunction with following figures. The number of ring-shaped reflective surfaces 510 may be more or less than that shown in FIG. 3. The ring-shaped reflective surfaces join together to form a spline. A spline is a mathematical function that has specified values at a finite number of points and consists of segments joined smoothly at these points. This disclosure uses the term spline to describe the shape or contour of the reflective surface 500 resulting from the joining of a number of reflective surfaces 510.

Figure 4:
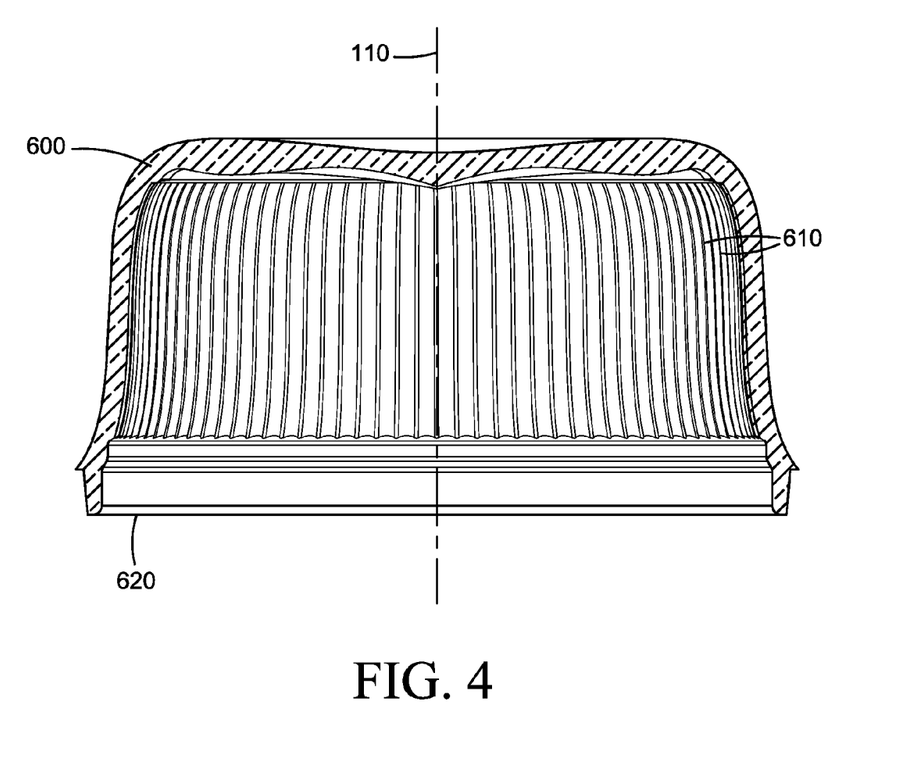
FIG. 4 shows a side view of an embodiment of the cover-lens.

FIG. 4 shows one embodiment of the cover-lens 600. The cover-lens bottom 620 is adapted to connect and seal to the base 200 of FIG. 1. The cover-lens 600 encloses the reflector 500 and printed circuit board 300 of FIG. 1. The cover-lens 600 has a number of lens segments 610 of which two are indicated. The lens segments 610 act to spread light exiting the light device or to concentrate light entering the light device 100 of FIG. 1. The lens segments 610 can be a number of styles including but not limited to, Fresnel or lenticular. In FIG. 4, the lens segments 610 are substantially parallel to the common axis 110. Light exiting the light device 100 is spread or blended to reduce or eliminate "hot spots" or areas of overly intense brightness. As a result, light is reflected from the reflective surfaces 510A-Q of FIG. 3, blended by the lens segments 610, such that the intensity of the light passing through the cover-lens 600 at a given angle relative to the plane of the printed circuit board 300 and at a given distance from the common axis 110 is of substantially equal intensity. Meanwhile, light entering the light device 100, is concentrated onto one or more light transducers 400. Following discussions and Figs. explain the advantages in more detail.

In some embodiments, the cover-lens 600 and lens segments 610 are of one piece. Common materials for the cover-lens are glass or plastics such as polycarbonate.

Figure 5:
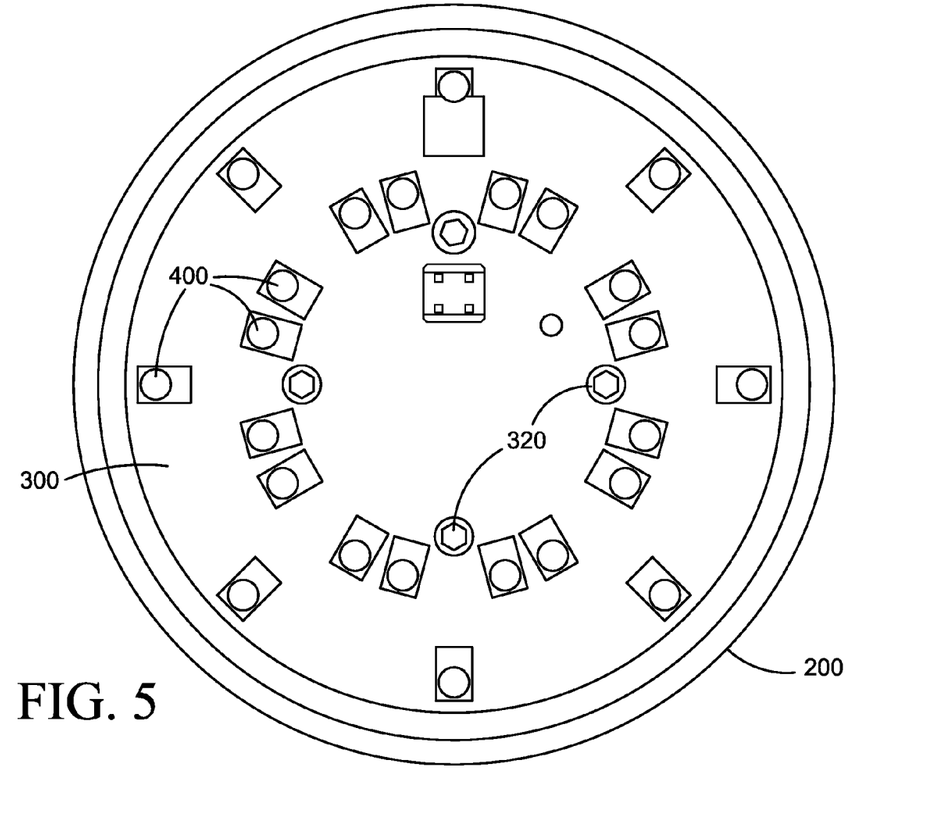
FIG. 5 shows a top view of an embodiment of the printed circuit board mounted upon the base.

FIG. 5 shows a top view of an embodiment of the printed circuit board 300 mounted upon the base 200. Fasteners 320 of which two are indicated attach the printed circuit board 300 to the base 200. In this embodiment the fasteners 320 are shown as screws. Other faster types such as adhesive, clips, or rivets are also possible. The light transducers 400, of which three are indicated, mount to the printed circuit board 300.

Figure 6:
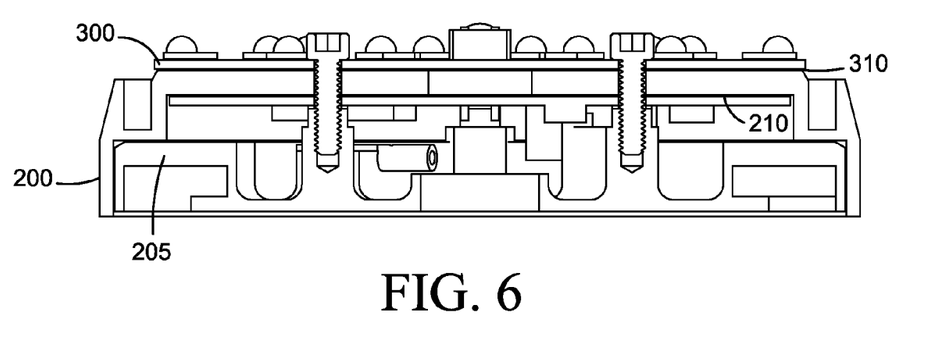
FIG. 6 shows a sectional view of an embodiment of the printed circuit board mounted upon the base with the base secured to an adapter.

FIG. 6 shows a sectional view of an embodiment of the printed circuit board 300 mounted upon the base 200. The base attaches to an adapter 205. The adapter attaches to an environmental object such as an aircraft (not shown). To aid in the transfer of heat from the printed circuit board 300, to the base 200, a thermal gasket 310 may be employed. The thermal gasket 310 may be a thermally conductive gasket material or a thermally conductive paste applied between the printed circuit board 300, and the base 200. To aid in the transfer of heat from the base 200 to the adapter 205, a thermal gasket 210 may be employed. The thermal gasket 210 may be a thermally conductive gasket material or a thermally conductive paste applied between the base 200 and the adapter 205.

Figure 7:
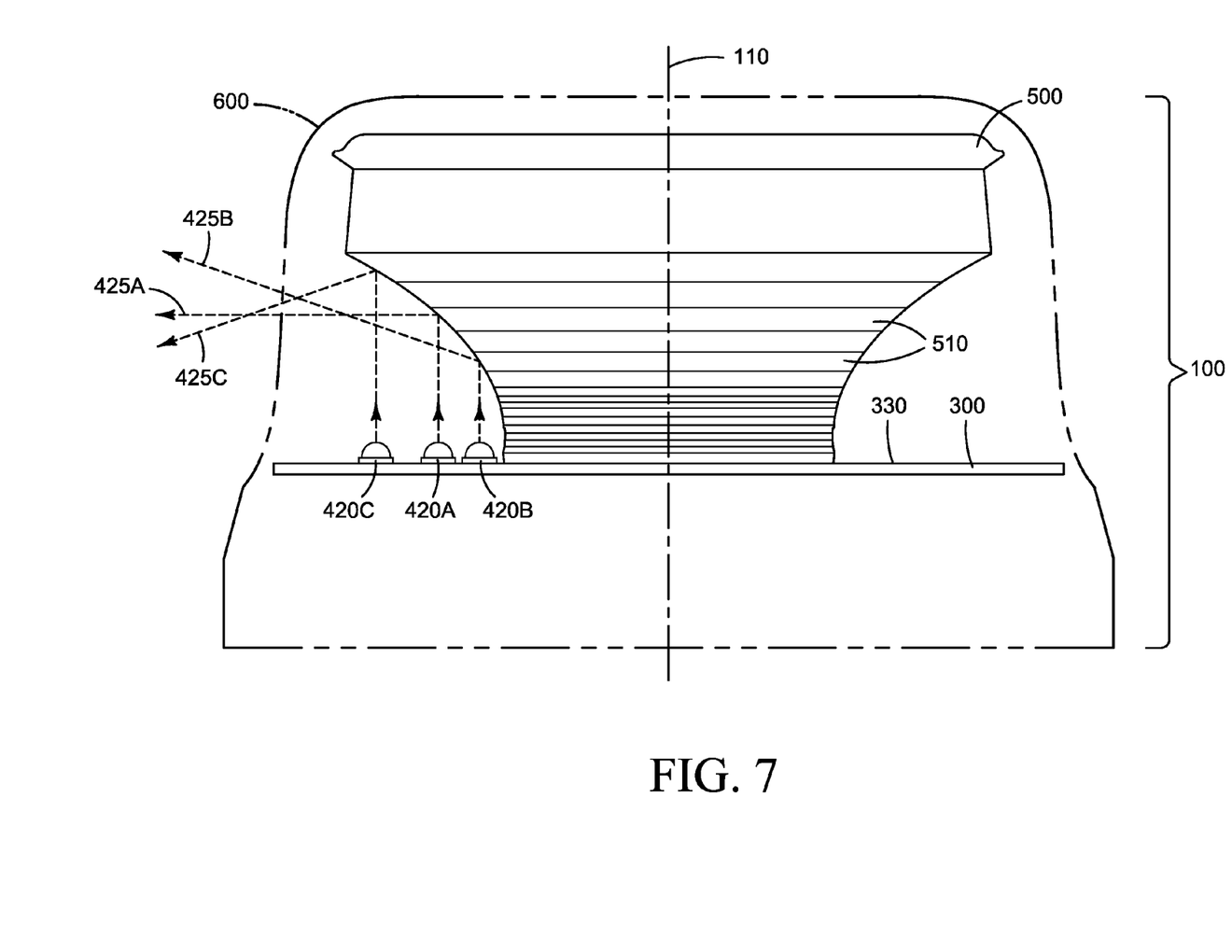
FIG. 7 shows a side view of an embodiment of the light device with emitted light ray paths.

In FIG. 7 the light transducers 400 of FIG. 1 are light emitters 420 of which three are shown, 420A, 420B and 420C. Light emitters 420A, 420B and 420C emit light rays 425A, 425B and 425C respectively. In the following disclosure, light emitters and emitted light rays will also be referred to simply as 420 and 425 respectively. The emitted light rays 425 can be of one or more wavelengths depending upon the type of the light emitters 420. The emitted light rays 425 reflect off of the reflector 500 and exit through the cover-lens 600. The lens segments 610 of FIG. 4 blend the emitted light rays 425 to create a substantially uniform light intensity at a given elevation and distance relative to the light device 100. Depending upon the type, light emitters 420, used singularly or in combination, can emit light in a wide spectrum from infrared to ultraviolet. Under the control of suitable electronics, the light device 100 can change emitted spectrum, flash at various rates, and encode data in the emitted light rays 425. The placement of the light emitters 420 on the printed circuit board 300 and the angle and placement of the reflective surfaces 510 control the illumination pattern of the light device 100. Some aircraft embodiments for example require a stronger beam emitted parallel to the plane 330 of the printed circuit board 300, in addition to a specified intensity of emitted light above and below the plane 330 of the printed circuit board 300. Thus the light device 100 can project a beam of light of controlled intensity above, below or at the plane 330 of the printed circuit board 300. In such a case, the reflective surfaces 510 are configured to reflect light from the light emitters 420 in a non-collimated beam, through the cover-lens 600. By controlling the number and placement of the light emitters 420, and the number, shape and placement of reflective surfaces 510 a number of beam intensity profiles can be realized.

In FIG. 7 for the sake of clarity, the cover-lens 600 is not shown. Light emitters 420 located on the printed circuit board 300 emit light rays 425 A-C which are reflected off of reflector 500. The various reflective surfaces 510 A-Q of FIG. 3 reflect the emitted light rays 425 A-C in different directions. The reflective surfaces 510 A-Q taken together form a spline as discussed in conjunction with FIG. 3. Emitted light ray 425A for example is reflected at an angle that is substantially parallel to the plane 330 of the printed circuit board, while emitted light rays 425B and 425C are reflected at angles above and below the plane of the printed circuit board. The reflective surfaces 510A-Q discussed previously are chosen and arranged in a spline to direct the emitted light rays 425 at the desired angles relative to the plane 330 of the printed circuit board. In the embodiment of FIG. 7 the reflective surfaces 510, of which two are indicated, are arranged to reflect a major part of the emitted light from the light emitters 420 substantially parallel to the plane 330 of the printed circuit board 300. Yet other light rays illuminate above and below the major beam. Thus, taken together, the reflective surfaces 510 are configured to reflect light from the light emitters 420 in a non-collimated beam, through the cover-lens.

Figure 8:
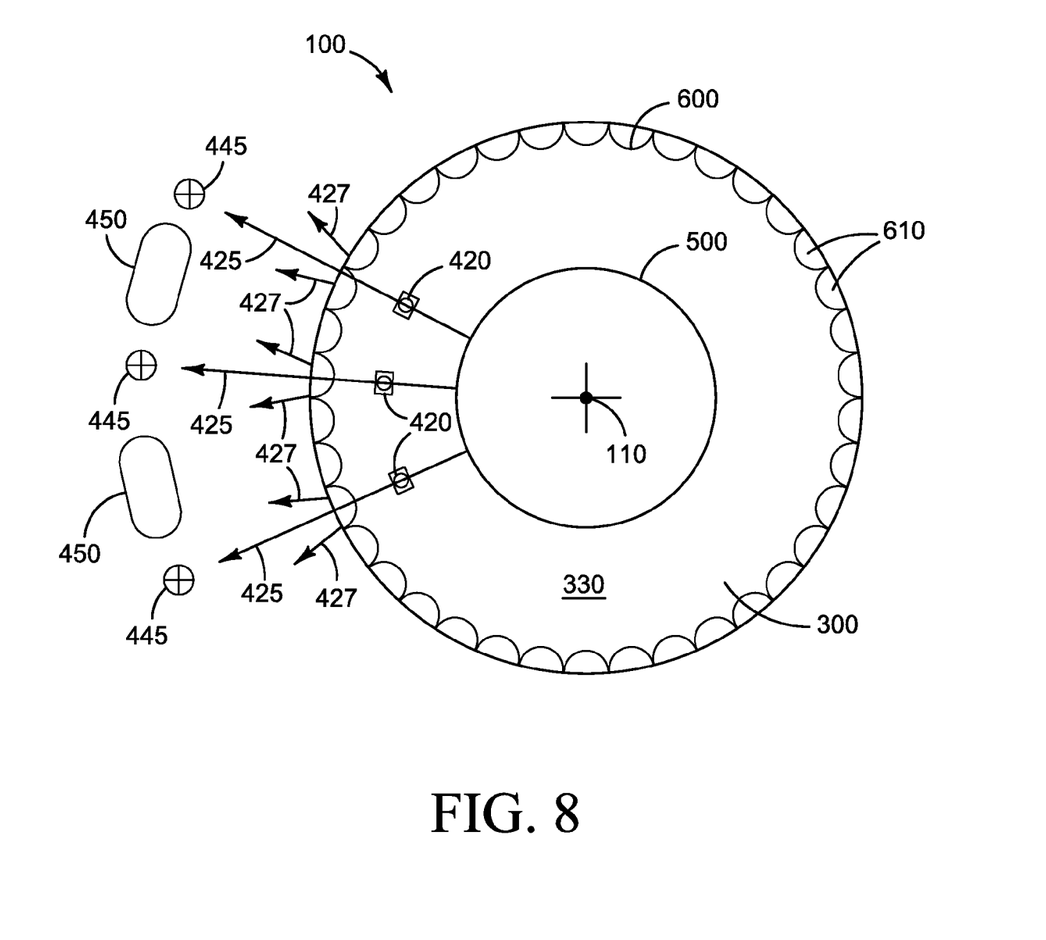
FIG. 8 shows a top view a top view of an embodiment of the light device with emitted light ray paths.

FIG. 8 depicts a top view of one embodiment of the light device 100 with the printed circuit board 300, reflector 500 and cover-lens 600. Emitted light rays 425 from light emitters 420 reflect off of reflector 500 and pass through cover-lens 600. Lens segments 610, of which two are indicated, act to blend the emitted light rays 425 to reduce hot spots 445. The lens segments 610, of which two are indicated, refract the light rays 425 to create additional light rays 427. The lens segments 610 of the cover-lens 600 are configured to blend the emitted light rays 425 reflected from the reflective surfaces 510A-Q of FIG. 3. Together light rays 425 and 427 combine such that the intensity of the light passing through the cover-lens 600 at a given angle relative to the plane of the printed circuit board 300 and at a given distance from the common axis 110 is of substantially equal intensity. The emitted light rays 427 are directed to blended light regions 450 rather than the hot spots 445 thus forming a substantially equal intensity.

Figure 9:
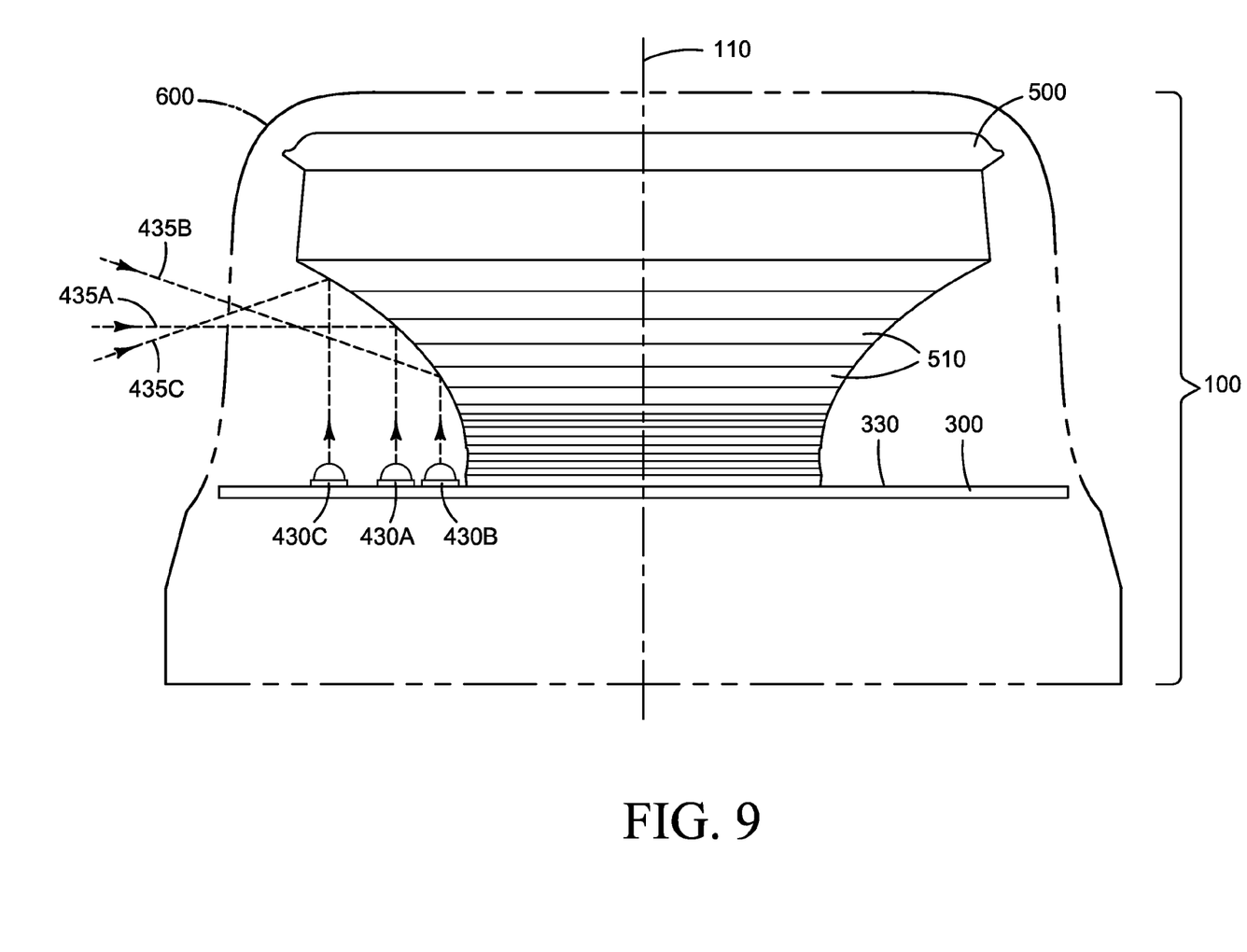
FIG. 9 shows a side view of an embodiment of the light device with received light ray paths.

FIG. 9 shows a side view of one embodiment of the light device 100 with received light rays 435A, 435B and 435C. For the sake of clarity, the cover-lens 600 is not shown. Light receivers 430A, 430B and 430C located on the plane 330 of the printed circuit board 300, receive light rays 435A, 435B and 435C which are reflected off of reflector 500. The various reflective surfaces 510 A-Q of FIG. 3 reflect the received light rays 435A, 435B and 435C in different directions onto the light receivers 430A, 430B and 430C. The reflective surfaces 510 A-Q taken together form a spline as discussed in conjunction with FIG. 3. In FIG. 9 two of the reflective surfaces are indicated as 510. Received light ray 435A for example is reflected from an angle that is substantially parallel to the plane 330 of the printed circuit board 300, while received light rays 435B and 435C are reflected from angles above and below the plane 330 of the printed circuit board 300. The reflective surfaces 510A-Q discussed previously are chosen and arranged in a spline to direct the received light rays 435 at the desired angles relative to the plane 330 of the printed circuit board 300. External circuitry can use the relative intensity at the light receivers 430A, 430B and 430C to determine the elevation of the incoming light rays 435A, 435B and 435C relative to the plane 330 of the circuit board 300.

Figure 10:
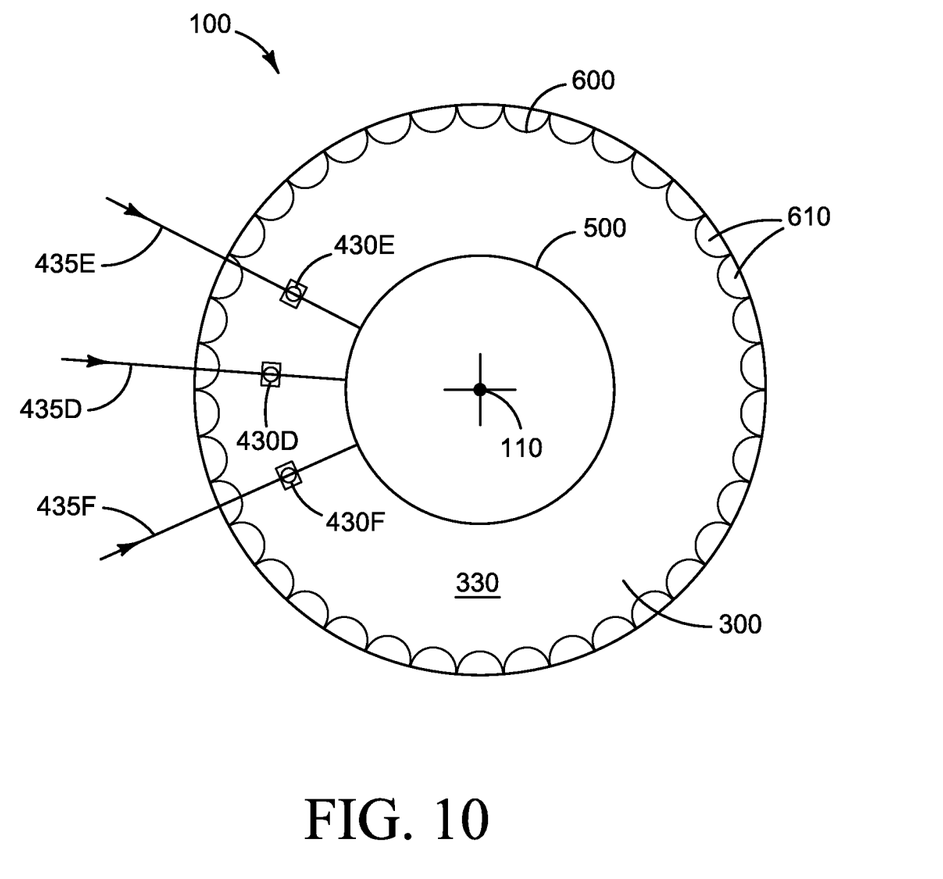
FIG. 10 shows a top view of an embodiment of the light device with received light ray paths.

FIG. 10 depicts a top view of one embodiment of the light device 100 with the printed circuit board 300, reflector 500 and cover-lens 600. Received light rays 435D, 435E and 435F enter light device 100 through the cover-lens 600. Received light rays 435D, 435E and 435F reflect off of one or more surfaces 510A-Q of the reflector 500 and onto the light receivers 430D, 430E and 430F located on the printed circuit board 300. The lens segments 610 of which two are indicated, act to concentrate the received light rays 435D, 435E and 435F onto selected light receivers 430D, 430E and 430F. By detecting the relative intensity of the light received among light receivers 430D, 430E and 430F, external circuitry can determine the angular direction or azimuth about the common axis 110 of the received light rays. When mounted on an aircraft, with the plane 330 of the circuit board 300 parallel to the plane of the aircraft, the light device 100 can detect the direction of a possible threat. A threat may take the form of a targeting beam of a weapon or another aircraft at a similar altitude. Additionally, a mix of light receivers 430 responsive to different wavelengths can further discriminate among various types of threats. Additional external circuitry coupled to the light receivers 430 can also discriminate among threats based on a pulse rate and any encoding in the received light rays 435.

Thus in operation, the light receivers 430 of FIG. 9 and FIG. 10 work together to determine the azimuth, elevation, and type of threat. While only three light receivers 430 were shown in FIG. 9 and FIG. 10, in practice larger numbers and types of light receivers 430 enable a finer resolution of the threat location and type.

Glossary

| Ref Number | Name |
| --- | --- |
| 100 | Light device |
| 110 | Common axis |
| 200 | Base |
| 205 | Adapter |
| 210 | Thermal gasket, base to adapter |
| 300 | Printed circuit board |
| 310 | Thermal gasket, printed circuit board to base |
| 320 | Fasteners, printed circuit to base |
| 330 | Plane of the printed circuit board |
| 400 | Light transducer |
| 420 A-C | Light emitter |
| 425, 425 A-C | Emitted light ray |
| 427 | Emitted light ray |
| 430 A-C | Light receiver |
| 435, 435 A-C, 435 D-F | Received light ray |
| 445 | Hot spot |
| 450 | Blended light region |
| 500 | Reflector, or spline of reflective surfaces |
| 510A-510Q | Ring-shaped reflective surface |
| 520 | Reflective coating |
| 110 | Common axis |
| 600 | Cover-lens |
| 610 | Lens segment |
| 620 | Cover-lens bottom |

The light emitters 420 of FIG. 7 and FIG. 8 and light receivers 430 of FIG. 9 and FIG. 10 can be combined in light device 100. While many operating modes are possible, one embodiment of combined receivers and emitters may use the receivers to detect threats in between flashes or pulses of the emitters. In other embodiments, the emitters and receivers may operate on different wavelengths simultaneously.

Although the light device has been described in terms of certain preferred embodiments, other embodiments that are apparent to those of ordinary skill in the art, including embodiments that do not provide all of the features and advantages set forth herein, are also within the scope of this invention. Rather, the scope of the present invention is defined only by reference to the appended claims and equivalents thereof.

We claim:

1. An aircraft light device comprising:
   a base;
   a printed circuit board attached to the base, the printed circuit board defining a plane;
   a reflector adjacent the printed circuit board, the reflector comprising a plurality of reflective surfaces, each reflective surface having a ring shape, the reflective surfaces centered about a common axis, the common axis being perpendicular to the printed circuit board;
   a cover-lens, connected to the base, the cover-lens enclosing, the reflector and the printed circuit board, the cover-lens further comprising lens segments; and
   a plurality of light transducers mounted on the printed circuit board, the light transducers active to light traversing the cover-lens, the light reflecting off of the reflective surfaces.

2. The aircraft light device of claim 1 wherein the reflective surfaces are parabolic in shape and the light transducers lie outside the foci of the reflective surfaces.

3. The aircraft light device of claim 1 wherein the lens segments of the cover-lens are substantially parallel to the common axis.

4. The aircraft light device of claim 1 wherein the reflective surfaces connect together to form a complex spline of reflective surfaces.

5. The aircraft light device of claim 1 wherein the light transducers are light emitting diodes, the light emitting diodes arranged to emit light, the light being reflected off of the reflective surfaces, the light passing through the cover-lens.

6. The light transducers of claim 1 wherein the light transducers are light emitting diodes and the reflective surfaces are configured to reflect light from the light emitting diodes in a non-collimated beam, through the cover-lens.

7. The aircraft light device of claim 6 wherein the reflective surfaces are arranged to reflect a major part of the emitted light from the light emitting diodes substantially parallel to the printed circuit board.

8. The aircraft light device of claim 5 wherein the lens segments of the cover-lens are configured to blend the light reflected from the reflective surfaces such that the intensity of the light passing through the cover-lens at a given angle relative to the plane of the printed circuit board and at a given distance from the common axis is of substantially equal intensity.

9. The aircraft light device of claim 1 wherein the light transducers are light receivers, the light receivers responsive to light entering the aircraft light device through the cover-lens, the light being reflected off of the reflective surfaces onto the light receivers.

10. The aircraft light device of claim 9 wherein the light receivers are arranged on the printed circuit board such that one or more light receivers are responsive to light reflected from specific reflective surfaces, whereby the elevation angle of light relative to the plane of the printed circuit board can be determined.

11. The aircraft light transceiver of claim 9 wherein the light receivers are arranged on printed circuit board such that one or more light receivers are responsive to light reflected from specific azimuths about the common axis.

12. The aircraft light device of claim 1 wherein some of the light transducers are light emitting diodes, the light emitting diodes arranged to emit light, the light being reflected off of the reflective surfaces, the light passing through the cover-lens; and some of the light transducers are light receivers, the light receivers responsive to light entering the aircraft light device through the cover-lens, the light being reflected off of the reflective surfaces onto the light receivers.

13. The light emitting diodes of claim 12 wherein the light emitting diodes and the reflective surfaces are configured to reflect light from the light emitting diodes in a non-collimated beam, through the cover-lens.

14. The aircraft light device of claim 12 wherein the reflective surfaces are arranged to reflect a major part of the emitted light from the light emitting diodes substantially parallel to the printed circuit board.

15. The aircraft light device of claim 12 wherein the lens segments of the cover-lens are configured to blend the emitted light reflected from the reflective surfaces such that the intensity of the light passing through the cover-lens at a given angle relative to the plane of the printed circuit board and at a given distance from the common axis is of substantially equal intensity.

16. The aircraft light device of claim 12 wherein the light receivers are arranged on the printed circuit board such that one or more light receivers are responsive to light reflected from specific reflective surfaces, whereby the elevation angle of light relative to the plane of the printed circuit board can be determined.

17. The light receivers of claim 12 wherein the light receivers are arranged on the printed circuit board such that one or more light receivers are responsive to light reflected from specific azimuth ranges about the common axis.

18. An aircraft light device comprising:
a base;
a printed circuit board attached to the base, the printed circuit board defining a plane;
a reflector, the reflector comprising a plurality of reflective surfaces, each reflective surface having a ring shape, the reflective surfaces centered about a common axis, the common axis being perpendicular to the printed circuit board, the reflective surfaces further connecting together to form a spline of reflective surfaces;
a cover-lens, connected to the base, the cover-lens enclosing the reflective surfaces and the printed circuit board;
a plurality of light emitting diodes, the light emitting diodes mounted on the printed circuit board, the light emitting diodes configured to emit light toward the reflective surfaces, the reflective surfaces arranged to reflect the light through the cover-lens; and
the cover-lens further comprising lens segments, the lens segments substantially parallel to the common axis, the lens segments of the cover-lens further configured to blend the light reflected from the reflective surfaces such that the light exiting the cover-lens at a given angle relative to the plane of the printed circuit board and at a given distance from the common axis is of substantially equal intensity.

19. An aircraft light device comprising:
a base;
a printed circuit board attached to the base, the printed circuit board defining a plane;
a reflector, the reflector comprising a plurality of reflective surfaces, each reflective surface having a ring shape, the reflective surfaces centered about a common axis, the common axis being perpendicular to the plane of the printed circuit board, the reflective surfaces arranged to reflect light entering the aircraft light device toward the printed circuit board, the reflective surfaces further connecting together to form a spline of reflective surfaces;
a cover-lens, connected to the base, the cover-lens enclosing the reflective surfaces and the printed circuit board;
a plurality of light receivers, the light receivers responsive to light entering the aircraft light device through the cover-lens, the light receivers arranged on the printed circuit board such that one or more light receivers are responsive to light reflected from specific reflective surfaces, whereby the elevation angle of light relative to the plane of the printed circuit board can be determined, the light receivers further arranged on the printed circuit board such that one or more light receivers are responsive to light reflected from specific azimuth ranges about the common axis; and
the cover-lens further comprising lens segments, the lens-segments substantially parallel to the common axis.

* * * * *